US006769304B2

United States Patent
Platt et al.

(10) Patent No.: US 6,769,304 B2
(45) Date of Patent: Aug. 3, 2004

(54) REDUCED START TIME FOR MEMS GYROSCOPE

(75) Inventors: William P. Platt, Columbia Heights, MN (US); Mark W. Weber, Zimmerman, MN (US)

(73) Assignee: Honeywell International Inc., Morristown, NJ (US)

( * ) Notice: Subject to any disclaimer, the term of this patent is extended or adjusted under 35 U.S.C. 154(b) by 34 days.

(21) Appl. No.: 10/114,968

(22) Filed: Apr. 2, 2002

(65) Prior Publication Data

US 2003/0183006 A1 Oct. 2, 2003

(51) Int. Cl.[7] ............................................. G01P 15/125
(52) U.S. Cl. ................................. 73/514.32; 73/504.02
(58) Field of Search ............ 73/504.02, 504.12–504.16, 73/514.1, 514.32

(56) References Cited

U.S. PATENT DOCUMENTS

| | | | |
|---|---|---|---|
| 5,747,961 A | 5/1998 | Ward et al. | 318/646 |
| 5,892,153 A | 4/1999 | Weinberg et al. | 73/504.16 |
| 5,911,156 A * | 6/1999 | Ward et al. | 73/504.16 |
| 6,064,169 A | 5/2000 | Ward et al. | 318/646 |
| 2001/0022106 A1 | 9/2001 | Kato et al. | 73/504.12 |

OTHER PUBLICATIONS

International Search Report for PCT/US03/09943 mailed on Aug. 13, 2003.

* cited by examiner

Primary Examiner—Hezron Williams
Assistant Examiner—John C Hanley
(74) Attorney, Agent, or Firm—McDonnell Boehnen Hulbert & Berghoff

(57) ABSTRACT

By applying a first value of voltage to a first side of a MEMS gyroscope and applying a second value of voltage to a second side of the MEMS gyroscope, the start time of the MEMS gyroscope may be improved. The first and second value of voltage may be provided by a bias power source, such as a battery or a super capacitor. The first value of voltage may be substantially equal in magnitude to and opposite in polarity to the second value of voltage. The bias power source may also be applied to drive electronics connected to the MEMS gyroscope. The bias power source may prevent amplifiers within the drive electronics from saturating during the start time.

30 Claims, 3 Drawing Sheets

REDUCED START TIME FOR MEMS GYROSCOPE

FIELD

The present invention relates generally to MEMS gyroscopes, and more particularly, relates to an improved start time of a MEMS gyroscope.

BACKGROUND

Microelectromechanical systems (MEMS) integrate electrical and mechanical devices on the same silicon substrate using microfabrication technologies. The electrical components are fabricated using integrated circuit processes, while the mechanical components are fabricated using micromachining processes that are compatible with the integrated circuit processes. This combination makes it possible to fabricate an entire system on a chip using standard manufacturing processes.

One common application of MEMS is the design and manufacture of sensor devices. The mechanical portion of the device provides the sensing capability, while the electrical portion processes the information obtained by the mechanical portion. One example of a MEMS sensor is a MEMS gyroscope.

A type of MEMS gyroscope uses a vibrating element to sense angular rate through the detection of a Coriolis acceleration. The vibrating element is put into oscillatory motion in the X-axis (drive plane), which is parallel to the substrate. Once the vibrating element is put in motion, it is capable of detecting angular rates induced by the substrate being rotated about the Z-axis (input plane), which is parallel to the substrate. The Coriolis acceleration occurs in the Y-axis (sense plane), which is perpendicular to both the X-axis and the Z-axis. The Coriolis acceleration produces a Coriolis motion that has an amplitude that is proportional to the angular rate of the substrate.

The start time of a device is the time required to produce a usable output after power application. A typical MEMS gyroscope takes between one and two seconds to start. There are MEMS gyroscope applications that require a faster start time. For example, some inertial measurement units (IMUs) that include one or more MEMS gyroscopes may require a start time of one second or less.

Therefore, it would be desirable to have a MEMS gyroscope that starts in one second or less.

SUMMARY

A MEMS gyroscope system and method for improving the start time of a MEMS gyroscope comprising of a MEMS gyroscope and a bias power source providing a first value of voltage to a first side of the MEMS gyroscope and a second value of voltage to a second side of the MEMS gyroscope is disclosed. The bias power source may also provide a voltage to drive electronics connected to the MEMS gyroscope.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
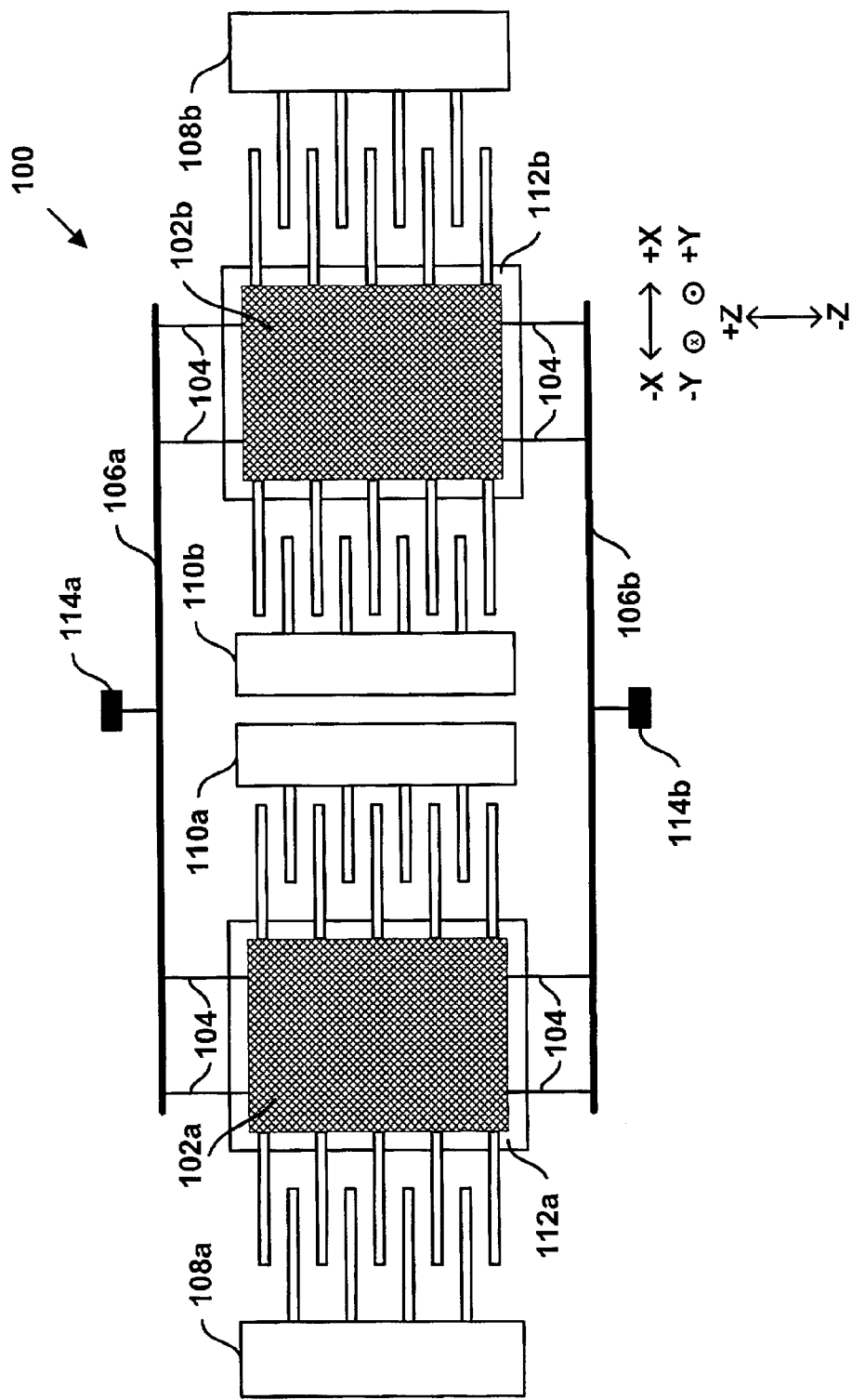
FIG. 1 is a plan view of a MEMS gyroscope, according to an exemplary embodiment.

FIG. 1 shows a plan view of a microelectromechanical system (MEMS) gyroscope 100 according to an exemplary embodiment. While FIG. 1 shows the MEMS gyroscope 100 as a tuning fork gyroscope, other MEMS gyroscopes that use the Coriolis acceleration to detect rotation, such as an angular rate sensing gyroscope, may also be used. The MEMS gyroscope 100 may be formed on a substrate and may include at least one proof mass 102a, 102b; a plurality of support beams 104; at least one cross beam 106a, 106b; at least one motor drive comb 108a, 108b; at least one motor pickoff comb 110a, 110b; at least one sense plate 112a, 112b; and at least one anchor 114a, 114b.

The at least one proof mass 102a, 102b may be any mass suitable for use in a MEMS gyroscope system. In a preferred embodiment, the at least one proof mass 102a, 102b is a plate of silicon. Other materials that are compatible with micromachining techniques may also be employed. FIG. 1 shows two proof masses; however, one or more proof masses may be employed.

The at least one proof mass 102a, 102b may be located substantially between the at least one motor drive comb 108a, 108b and the at least one motor pickoff comb 110a, 110b. The at least one proof mass 102a, 102b may contain a plurality of comb-like electrodes extending towards both the at least one motor drive comb 108a, 108b and the at least one motor pickoff comb 110a, 110b. While the at least one proof mass 102a, 102b has ten electrodes as depicted in FIG. 1, the number of electrodes on the at least one proof mass 102a, 102b may be more or less than ten.

The at least one proof mass 102a, 102b may be supported above the at least one sense plate 112a, 112b by the plurality of support beams 104. While eight support beams 104 are depicted in FIG. 1, the number of support beams used may be more or less than eight. The plurality of support beams 104 may be beams micromachined from a silicon wafer. The plurality of support beams 104 may act as springs allowing the at least one proof mass 102a, 102b to move within the drive plane (X-axis) and the sense plane (Y-axis). (See FIG. 1 for axis information.)

The plurality of support beams 104 may be connected to at least one cross beam 106a, 106b. The at least one cross beam 106a, 106b may be connected to at least one anchor 114a, 114b providing support for the MEMS gyroscope 100. The at least one anchor 114a, 114b may be connected to the underlying substrate. While two anchors 114a, 114b are depicted in FIG. 1, the number of anchors may be more or less than two. The at least one anchor 114a, 114b may be positioned along the at least one cross beam 106a, 106b in any manner that provides support to the MEMS gyroscope 100.

The at least one motor drive comb 108a, 108b may include a plurality of comb-like electrodes extending towards the at least one proof mass 102a, 102b. While the at least one motor drive comb 108a, 108b has four electrodes as depicted in FIG. 1, the number of electrodes on the at least one motor drive comb 108a, 108b may be more or less than four. The number of the electrodes on the at least one motor drive comb 108a, 108b may be determined by the number of electrodes on the at least one proof mass 102a, 102b.

The plurality of interdigitated comb-like electrodes of the at least one proof mass 102a, 102b and the at least one motor drive comb 108a, 108b may form capacitors. The at least one motor drive comb 108a, 108b may be connected to drive electronics, not shown in FIG. 1. The drive electronics may cause the at least one proof mass 102a, 102b to oscillate at substantially a tuning fork frequency along the drive plane (X-axis) by using the capacitors formed by the plurality of interdigitated comb-like electrodes of the at least one proof mass 102a, 102b and the at least one motor drive comb 108a, 108b.

The at least one motor pickoff comb 110a, 110b may include a plurality of comb-like electrodes extending towards the at least one proof mass 102a, 102b. While the at least one motor pickoff comb 110a, 110b has four electrodes as depicted in FIG. 1, the number of electrodes on the at least one motor pickoff comb 110a, 110b may be more or less than four. The number of the electrodes on the at least one motor pickoff comb 110a, 110b may be determined by the number of electrodes on the at least one proof mass 102a, 102b.

The plurality of interdigitated comb-like electrodes of the at least one proof mass 102a, 102b and the at least one motor pickoff comb 110a, 110b may form capacitors, which may allow the MEMS gyroscope 100 to sense motion in the drive plane (X-axis).

The at least one sense plate 112a, 112b may form a parallel capacitor with the at least one proof mass 102a, 102b. If an angular rate is applied to the MEMS gyroscope 100 along the input plane (Z-axis) while the at least one proof mass 102a, 102b is oscillating along the drive plane (X-axis), a Coriolis force may be detected in the sense plane (Y-axis). The parallel capacitor may be used to sense motion in the sense plane (Y-axis). The output of the MEMS gyroscope 100 may be a signal proportional to the change in capacitance. The at least one sense plate 112a, 112b may be connected to sense electronics, not shown in FIG. 1. The sense electronics may detect the change in capacitance as the at least one proof mass 102a, 102b moves towards and/or away from the at least one sense plate 112a, 112b.

Figure 2:
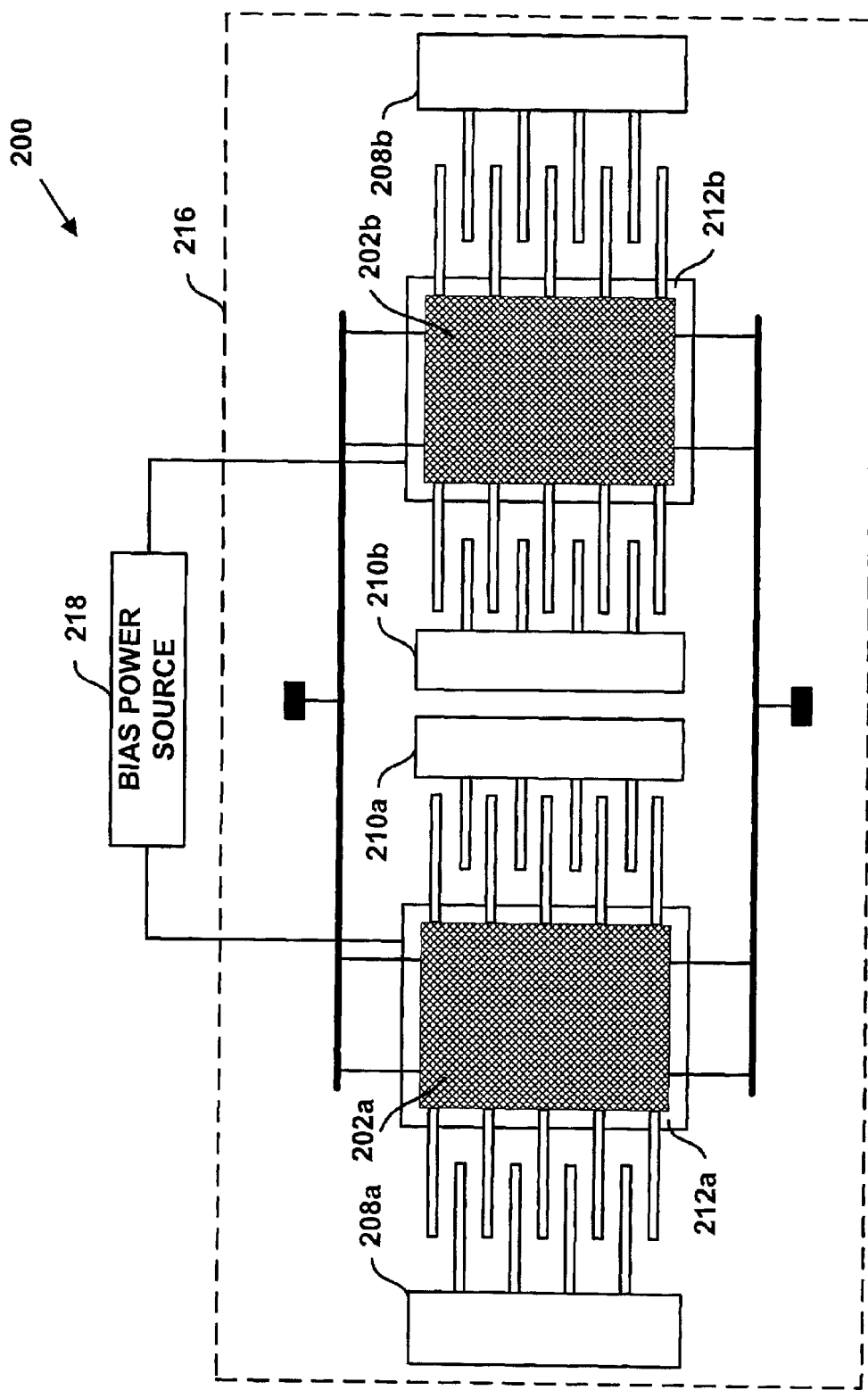
FIG. 2 is a plan view of a MEMS gyroscope system, according to an exemplary embodiment.
Figure 3:
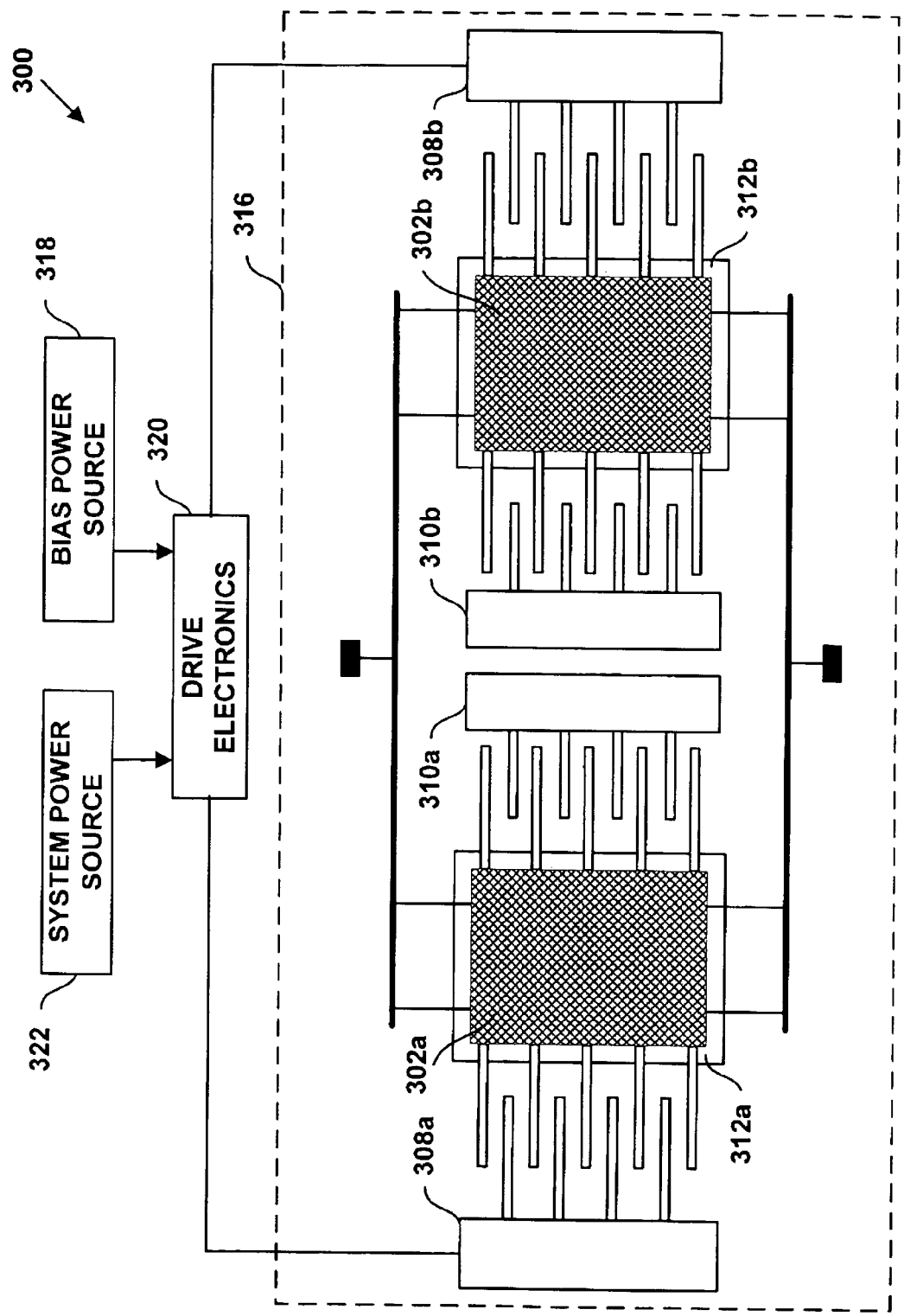
FIG. 3 is a plan view of a MEMS gyroscope system, according to another exemplary embodiment.

FIG. 2 shows a plan view of a MEMS gyroscope system 200. The MEMS gyroscope system 200 may include a MEMS gyroscope 216 and a bias power source 218. The MEMS gyroscope system may also include sense electronics, drive electronics, a system power source, and other typical operational electronics, which are not shown in FIG. 2 for the sake of simplification. The drive electronics and the system power source are depicted in FIG. 3. The MEMS gyroscope 216 may be substantially the same as the MEMS gyroscope 100 as depicted in FIG. 1. The bias power source 218 may be a battery, a super capacitor, or any other power source operable to provide a substantially continuous source of power. In a preferred embodiment, a long life battery is employed.

To start the MEMS gyroscope system 200, the system power source may provide power to the MEMS gyroscope 216. The system power source may be any power source used to power a typical MEMS gyroscope. For example, the system power source may be the power source for an avionics system that includes at least one MEMS gyroscope. The system power source may provide power based upon the system application. The system power source typically provides power in the range of 5 to 1000 volts; however, this embodiment is not limited to that range.

When the system power source is applied to the MEMS gyroscope 216, the parallel capacitor formed by the at least one sense plate 212a, 212b and the at least one proof mass 202a, 202b may begin charging. The charge time of the parallel capacitor may be inversely proportional to the product of the circuit resistance and the circuit capacitance. This charge time may impact the start time of the MEMS gyroscope system 200. For example, the longer it takes for the parallel capacitor to charge, the longer the delay may be from the time when the system power source is applied to when the MEMS gyroscope system 200 may provide meaningful angular rate detection data.

To reduce the start time of the MEMS gyroscope system 200, the bias power source 218 may provide a substantially continuous source of voltage to the MEMS gyroscope 216. The bias power source 218 may provide a first value of voltage to a first side of the MEMS gyroscope 216 and a second value of voltage to a second side of the MEMS gyroscope 216. In a preferred embodiment, the first value of voltage has a magnitude equal to and a polarity opposite of the second value of voltage. For example, the first value of voltage may be +5 volts and the second value of voltage may be −5 volts. However, the first value of voltage may be a different magnitude than the second value of voltage, and the first and second voltages may have the same polarity.

In a preferred embodiment the first value of voltage may be applied to a first sense plate 212a of the MEMS gyroscope 216 and the second value of voltage may be applied to a second sense plate 212b of the MEMS gyroscope 216. However, other components of the MEMS gyroscope 216 may receive the substantially continuous source of voltage, such as the at least one motor drive comb 208a, 208b or the at least one motor pickoff comb 210a, 210b. Alternatively, the bias power source 218 may apply the first value of voltage to more than one component on the first side on the MEMS gyroscope 216 and may apply the second value of voltage to more than one component on the second side of the MEMS gyroscope 216. For example, the first value of voltage may be applied to a first motor drive comb 208a and the first sense plate 212a, and the second value of voltage may be applied to a second motor drive comb 208b and the second sense plate 212b.

By keeping the substantially continuous voltage applied to the at least one sense plate 212a, 212b, the charge time of the parallel capacitors formed by the at least one sense plate 212a, 212b and the at least one proof mass 202a, 202b may be reduced. The charge time of the parallel capacitors may be substantially eliminated if the bias power source 218 provides power that is substantially equal in magnitude and polarity as the system power source to the first sense plate 212a, and substantially equal in magnitude and opposite polarity as the system power source to the second sense plate 212b. For this example, assume that the system power source provides +5 volts to the MEMS gyroscope system 200. The charge time of the parallel capacitors may be substantially eliminated if the bias power supply 218 applies +5 volts to the first sense plate 212a and −5 volts to the second sense plate 212b.

The charge time of the parallel capacitors may also be substantially reduced if the bias power source 218 provides voltage that is less in magnitude than the system power source. The bias power source 218 may provide less voltage than the system power source by design or because the bias power source 218 has degraded over time. For example, the MEMS gyroscope system 200 application may require a faster start time, but may also have space and temperature constraints that require a smaller battery.

Alternatively, the MEMS gyroscope system 200 application may require the MEMS gyroscope 216 to be placed in storage for many years. The bias power source 218 may be a battery designed to continuously provide voltage substantially equal in magnitude as provided by the system power source. Over time the battery may degrade and may provide substantially less voltage than the system power source provides. For this example, assume that the system power source provides +5 volts to the MEMS gyroscope system 200. The charge time of the parallel capacitors may be substantially reduced if the bias power supply 218 applies +3 volts to the first sense plate 212a and −3 volts to the second sense plate 212b.

By reducing the charge time of the parallel capacitors formed by the at least one sense plate 212a, 212b and the at least one proof mass 202a, 202b, the start time of the MEMS gyroscope system 200 may be reduced. For a typical MEMS gyroscope with a start time of one to two seconds, the start time may be reduced to one second or less by applying a substantially continuous source of voltage to the MEMS gyroscope 216. This start time may be beneficial for MEMS gyroscope applications that require the start time to be one second or less. For example, some inertial measurement units (IMUs) that include one or more MEMS gyroscopes may require a start time of one second or less.

FIG. 3 shows a plan view of a MEMS gyroscope system 300. The MEMS gyroscope system 300 may include a MEMS gyroscope 316, a bias power source 318, drive electronics 320, and a system power source 322. The MEMS gyroscope system 300 may also include sense electronics and other typical operational electronics, which are not shown in FIG. 3 for the sake of simplification. The MEMS gyroscope 316 may be substantially the same as the MEMS gyroscope 100 as depicted in FIG. 1. The bias power source 318 may be substantially the same as the bias power source 218 of the MEMS gyroscope system 200. The system power source 322 applies power to the drive electronics 320 and to the sense electronics as is well known in the art.

The drive electronics 320 may include at least one amplifier. The at least one amplifier may include a resistor-capacitor network. When the system power source 322 is applied to the MEMS gyroscope 316, the at least one amplifier may saturate. The start time of the MEMS gyroscope system 300 may be increased by the amount of time it takes for the at feast one amplifier to become unsaturated.

The bias power source 318 may apply a substantially continuous voltage to the drive electronics 320, which may prevent the at least one amplifier from saturating. For example, the bias power source 318 may provide substantially 5 volts to the drive electronics 320. However, other values of voltage may also be provided. By preventing the at least one amplifier in the drive electronics 320 from saturating, the start time of the MEMS gyroscope system 300 may be reduced. The bias power source may 318 may be applied to both the drive electronics 320 and the at least one sense plate 312a, 312b.

It should be understood that the illustrated embodiments are exemplary only and should not be taken as limiting the scope of the present invention. While a MEMS tuning fork gyroscope is employed to illustrate the invention, the present invention also applies to other MEMS gyroscopes that use the Coriolis acceleration to detect rotation, such as an angular rate sensing gyroscope. The claims should not be read as limited to the described order or elements unless stated to that effect. Therefore, all embodiments that come within the scope and spirit of the following claims and equivalents thereto are claimed as the invention.

The embodiments of the invention in which an exclusive property or right is claimed are defined as follows:

We claim:

1. A system to improve a start time of a MEMS gyroscope, comprising in combination:
   a MEMS gyroscope; and
   a bias power source connected to the MEMS gyroscope operable to provide a substantially continuous source of voltage to a subsection of the MEMS gyroscope when a system power source is not applying power to the MEMS gyroscope, wherein the substantially continuous source of voltage maintains an electrostatic charge between a proof mass and a sense plate in the MEMS gyroscope.

2. The system of claim 1, wherein the MEMS gyroscope is a MEMS tuning fork gyroscope.

3. The system of claim 1, wherein the MEMS gyroscope uses a Coriolis acceleration to detect rotation.

4. The system of claim 1, wherein the bias power source is a long life battery.

5. The system of claim 1, wherein the bias power source is a super capacitor.

6. The system of claim 1, wherein the bias power source provides a first value of voltage to a first side of the MEMS gyroscope and a second value of voltage to a second side of the MEMS gyroscope.

7. The system of claim 6, wherein the first value of voltage is substantially equal in magnitude to the second value of voltage.

8. The system of claim 6, wherein the first value of voltage has a polarity opposite to the second value of voltage.

9. The system of claim 6, wherein the first side of the MEMS gyroscope includes components selected from the group consisting of a sense plate, a motor drive comb, and a motor pickoff comb.

10. The system of claim 6, wherein the second side of the MEMS gyroscope includes components selected from the group consisting of a sense plates a motor drive comb, and a motor pickoff comb.

11. The system of claim 6, wherein the first value of voltage is applied to at least one component on the first side of the MEMS gyroscope.

12. The system of claim 6, wherein the second value of voltage is applied to at least one component on the second side of the MEMS gyroscope.

13. The system of claim 6, wherein the first value of voltage is applied to a first sense plate and the second value of voltage is applied to a second sense plate.

14. The system of claim 1, wherein a charge time of a parallel capacitor formed by the proof mass and the sense plate is substantially eliminated when the bias power source provides a substantially continuous source of voltage substantially equal to an amount of voltage to be provided by the system power source.

15. The system of claim 1, wherein a charge time of a parallel capacitor formed by the proof mass and the sense plate is substantially reduced when the bias power source provides a substantially continuous source of voltage substantially less than an amount of voltage to be provided by the system power source.

16. A system to improve a start time of a MEMS gyroscope, comprising in combination:
   a MEMS tuning fork gyroscope operable to use a Coriolis acceleration to detect rotation; and
   a long life battery providing a substantially continuous source of voltage to the MEMS tuning fork gyroscope when a system power source is not applying power to the MEMS tuning fork gyroscope wherein the long life battery apples a first valise of voltage to a first sense plate and a second value of voltage to a second sense plate, wherein the first value of voltage is substantially equal in magnitude to the second value of voltage, wherein the first value of voltage has a polarity opposite to the second value of voltage, wherein the first value of voltage maintains a first electrostatic charge in a first parallel capacitor formed by the first sense plate and a first proof mass, wherein the second value of voltage maintains a second electrostatic charge in a second parallel capacitor formed by the second sense date and a second proof mass, and wherein a charge time of the first and second parallel capacitors is substantially reduced when the bias power source provides a continuous source of voltage substantially less than an amount of voltage to be provided by the system power source.

17. A method to improve a start time of a MEMS gyroscope system, comprising in combination:

applying a first value of voltage from a substantially continuous source of voltage to a subsection of a first side of the MEMS gyroscope when a system power source is not applying power to the MEMS gyroscope, wherein the first value of voltage maintains an electrostatic charge between a first proof mass and a first sense plate in the MEMS gyroscope; and applying a second value of voltage from the substantially continuous source of voltage to a subsection of a second side of the MEMS gyroscope when the system power source is not applying power to the MEMS gyroscope, wherein the second value of voltage maintains an electrostatic charge between a second proof mass and a second sense plate in the MEMS gyroscope.

18. The method of claim 17, wherein the MEMS gyroscope is a tuning fork gyroscope.

19. The method of claim 17, wherein the MEMS gyroscope uses a Coriolis acceleration to detect rotation.

20. The method of claim 17, wherein the substantially continuous source of voltage is a long file battery.

21. The method of claim 17, wherein the substantially continuous source of voltage is a super capacitor.

22. The method of claim 17, wherein the first value of voltage is substantially equal in magnitude to the second value of voltage.

23. The method of claim 17, wherein the first value of voltage has a polarity opposite to the second value of voltage.

24. The method of claim 17, wherein the first side of the MEMS gyroscope includes components selected from the group consisting of a sense plate, a motor drive comb, and a motor pickoff comb.

25. The method of claim 17, wherein the second side of the MEMS gyroscope includes components selected from the group consisting of a sense plate, a motor drive comb, and a motor pickoff comb.

26. The method of claim 17, wherein the first value of voltage is applied to at least one component on the first side of the MEMS gyroscope.

27. The method of claim 17, wherein the second value of voltage is applied to at least one component on the second side of the MEMS gyroscope.

28. The method of claim 17, wherein the second value of voltage is applied to the first sense plate and the second value of voltage is applied to the second sense plate.

29. The method of claim 17, wherein a charge time of parallel capacitors formed by the first and second proof masses and the first and second sense plates is substantially eliminated when the substantially continuous source of voltage provides a continuous source of voltage substantially equal to an amount of voltage to be supplied by the system power source.

30. The method of claim 17, wherein a charge time of parallel capacitors formed by the first and second proof masses and the first and second sense plates is substantially reduced when the substantially continuous source of voltage provides a continuous source of voltage substantially less than an amount of voltage to be supplied by the system power source.

* * * * *